(12) United States Patent
White et al.

(10) Patent No.: US 8,627,399 B2
(45) Date of Patent: Jan. 7, 2014

(54) SYSTEM AND METHOD OF DELIVERING TELEVISION CONTENT

(75) Inventors: Scott White, Austin, TX (US); James L. Cansler, Pflugerville, TX (US); Ian C. Schmehl, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 768 days.

(21) Appl. No.: 12/023,715

(22) Filed: Jan. 31, 2008

(65) Prior Publication Data

US 2009/0199245 A1   Aug. 6, 2009

(51) Int. Cl.
*H04N 7/173* (2011.01)
*H04N 7/16* (2011.01)
*H04N 7/20* (2006.01)
*H04N 7/18* (2006.01)

(52) U.S. Cl.
USPC ......... 725/133; 725/62; 725/71; 725/74; 725/81; 725/110; 725/131; 725/139; 725/141; 725/151; 725/153; 455/3.02

(58) Field of Classification Search
USPC .......... 725/81, 62, 71, 74, 82, 110, 118, 131, 725/133, 139, 141, 151, 153; 455/3.02; 348/552
See application file for complete search history.

(56) References Cited

U.S. PATENT DOCUMENTS

| | | | |
|---|---|---|---|
| 5,831,664 A * | 11/1998 | Wharton et al. | 725/81 |
| 6,496,122 B2 * | 12/2002 | Sampsell | 340/4.42 |
| 6,870,570 B1 * | 3/2005 | Bowser | 348/552 |
| 7,344,084 B2 * | 3/2008 | DaCosta | 235/472.01 |
| 7,533,271 B2 * | 5/2009 | Laksono | 713/184 |
| 7,584,497 B2 * | 9/2009 | Potrebic et al. | 725/116 |
| 7,624,417 B2 * | 11/2009 | Dua | 725/114 |
| 7,861,272 B2 * | 12/2010 | Russ et al. | 725/74 |
| 7,870,281 B2 * | 1/2011 | Masunaga et al. | 709/231 |
| 7,908,625 B2 * | 3/2011 | Robertson et al. | 725/82 |
| 7,950,037 B2 * | 5/2011 | Mensch | 725/62 |
| 7,958,530 B2 * | 6/2011 | Fukuda et al. | 725/62 |
| 2001/0039180 A1 * | 11/2001 | Sibley et al. | 455/3.02 |
| 2002/0057209 A1 * | 5/2002 | Sampsell | 340/825.69 |
| 2002/0174444 A1 * | 11/2002 | Gatto et al. | 725/133 |
| 2003/0106072 A1 * | 6/2003 | Soundararajan | 725/151 |
| 2004/0070696 A1 * | 4/2004 | Roh et al. | 348/836 |
| 2005/0060750 A1 * | 3/2005 | Oka et al. | 725/80 |
| 2005/0076374 A1 * | 4/2005 | Nakamura | 725/81 |
| 2005/0080884 A1 * | 4/2005 | Siorpaes et al. | 709/223 |

(Continued)

OTHER PUBLICATIONS

"Apple TV," from Wikipedia, http://en.wikipedia.org/wiki/Apple_TV, pp. 1-14, Jan. 23, 2008.

*Primary Examiner* — Pinkal R Chokshi
(74) *Attorney, Agent, or Firm* — Guntin & Gust, PLC; Douglas Schnabel (57) ABSTRACT

A computer-readable medium is disclosed and includes processor-readable instructions executable by a processor to perform a method. The method includes sending a request for television content from a first device that is not equipped with a television tuner to a second device that is equipped with at least one television tuner via a wireless local area network (WLAN). The method also includes receiving the television content at the first device directly from the second device via the WLAN. The television content is received at the second device via the at least one television tuner. Further, the method includes outputting the television content at the first device.

20 Claims, 6 Drawing Sheets

(56) References Cited

U.S. PATENT DOCUMENTS

| | | |
|---|---|---|
| 2005/0108762 A1* | 5/2005 | Chao et al. .................... 725/81 |
| 2005/0147049 A1* | 7/2005 | Ganesan ....................... 370/241 |
| 2005/0204399 A1* | 9/2005 | Matsunobu et al. ........... 725/117 |
| 2006/0098821 A1* | 5/2006 | Tomiyasu ..................... 380/200 |
| 2006/0170071 A1* | 8/2006 | Imaoka et al. ................ 257/531 |
| 2006/0209174 A1* | 9/2006 | Isaac et al. ................. 348/14.01 |
| 2006/0277584 A1* | 12/2006 | Taylor .......................... 725/112 |
| 2006/0286984 A1* | 12/2006 | Bonner ......................... 455/445 |
| 2007/0032975 A1* | 2/2007 | Mori et al. ..................... 702/86 |
| 2007/0050823 A1* | 3/2007 | Lee et al. ....................... 725/80 |
| 2007/0124792 A1* | 5/2007 | Bennett et al. ................ 725/133 |
| 2007/0143806 A1 | 6/2007 | Pan |
| 2007/0250870 A1 | 10/2007 | Kim et al. |
| 2007/0250871 A1* | 10/2007 | Wu et al. ........................ 725/81 |
| 2008/0127277 A1* | 5/2008 | Kuschak ......................... 725/74 |
| 2008/0163330 A1* | 7/2008 | Sparrell ......................... 725/142 |
| 2008/0205389 A1* | 8/2008 | Fang et al. .................... 370/389 |
| 2008/0244660 A1* | 10/2008 | Wodka et al. .................. 725/58 |
| 2011/0310862 A9* | 12/2011 | Doyle et al. ................... 370/338 |

* cited by examiner

SYSTEM AND METHOD OF DELIVERING TELEVISION CONTENT

FIELD OF THE DISCLOSURE

The present disclosure generally relates to delivering television content.

BACKGROUND

Many homes are equipped with multiple devices that are capable of displaying or otherwise outputting content received from television service providers and other sources. These devices are typically equipped with television tuners that can switch between channels. Devices equipped with television tuners can often sit idle for significant periods of time, when users are not actively using them.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
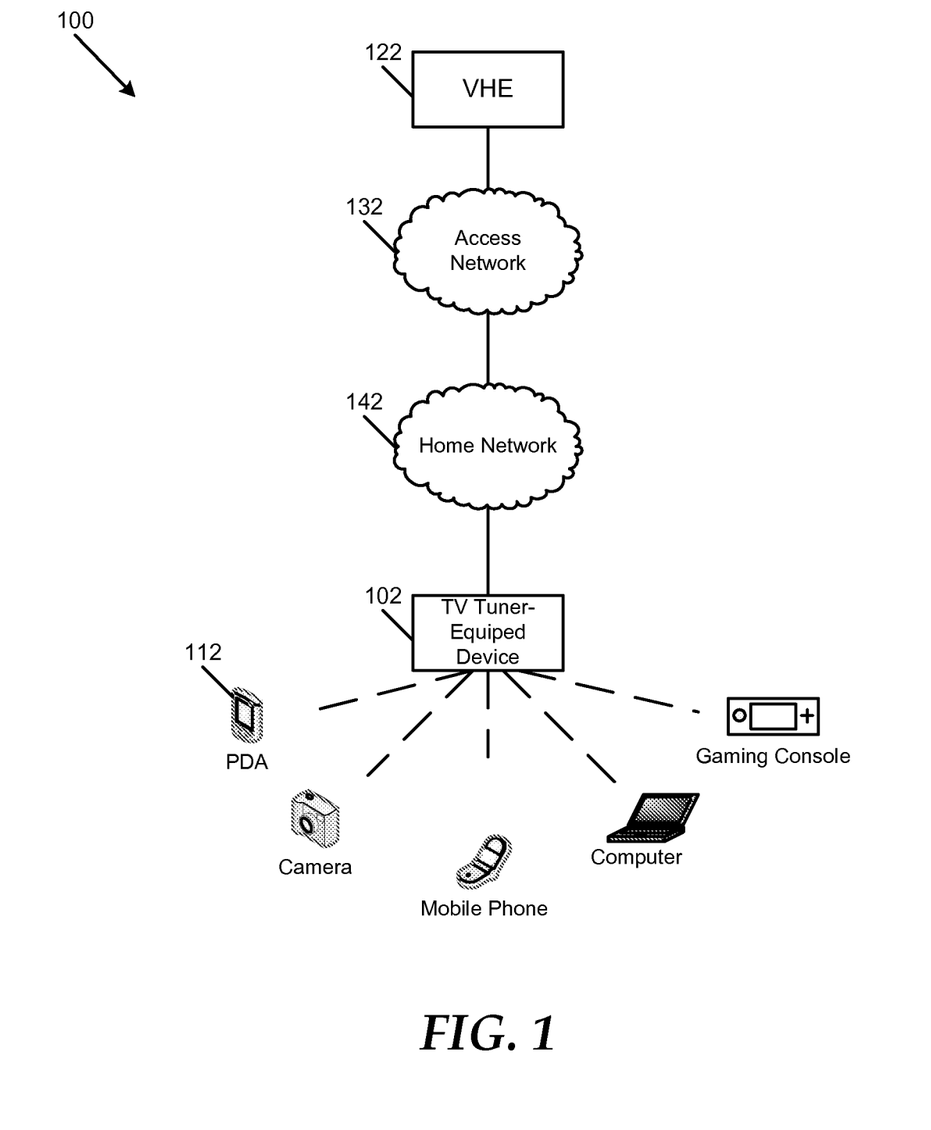
FIG. 1 is a block diagram illustrating a particular embodiment of a system to deliver television content.

FIG. 1 illustrates a particular embodiment of a system 100 to deliver television content. The system 100 includes a first device 102 that includes at least one television tuner and that is adapted to communicate with at least one second device 112 that is not equipped with a television tuner. Examples of devices equipped with at least one television tuner can include set-top box devices, televisions, gaming consoles (handheld and otherwise), other devices equipped with at least one television tuner, as well as combinations of such devices. Examples of devices that are not equipped with a television tuner can include personal data assistants (PDAs), digital cameras, mobile phones, laptop computers, personal computers, gaming consoles (handheld and otherwise), portable digital video disc (DVD) players, digital music players, other electronic devices that are not equipped with a television tuner, as well as combinations of such devices.

The first device 102 is adapted to receive television content via at least one television tuner from a video head-end (VHE) 122 of a television service provider, such as a cable television service provider, a satellite television service provider, or an Internet Protocol Television (IPTV) service provider, via an access network 132. In a particular embodiment, the first device 102 can be adapted to communicate with the access network 132 via a home network 142, which may also communicate with other devices at a user premises. In another embodiment, the first device 102 can include at least one tuner adapted to receive over-the-air content, such as an Advanced Television Standards Committee (ATSC) tuner or a National Television Standards Committee (NTSC) tuner.

In an illustrative embodiment, each second device 112 is adapted to receive an input requesting television content. The input can comprise, for example, a selection of a physical switch, button or other part of the second device 112, or a selection of a graphical menu item, icon, text, or other indicator, displayed at the second device 112. In response to the input, the second device 112 is adapted to send a request for television content to the first device 102 via a Wi-Fi network or other WLAN. The request may identify a particular channel. In one embodiment, the second device 112 can be adapted to activate a wireless local area network (WLAN) interface in response to the selection. In some embodiments, the second device 112 may be adapted to deactivate another wireless interface, such as a cellular network interface, in response to the input. Further, the second device 112 can be adapted to activate or shift to a WLAN mode, television mode, or other mode in response to the input.

The first device 102 is adapted to receive requests for television content from a second device 112 via the WLAN. The first device 102 is adapted to receive television content from the VHE 142 or another source via a tuner and to send the television content directly to the second device 112 via the WLAN (i.e., without sending the television content to a third device that is separate from and facilitates communication between the first device 102 and the second device 112). In an illustrative embodiment, the first device 102 can be adapted to narrowcast the television content to the second device 112. In some embodiments, the first device 102 can be adapted to send television content directly to multiple second devices that request the television content.

The second device 112 is adapted to receive the television content directly from the first device 102 via the WLAN and to output the television content via a display portion, at least one audio output, or a combination thereof. The television content can include video content, audio content, or a combination thereof. In a particular embodiment, the second device 112 can be adapted to receive a channel change command or other command to request content associated with a particular television channel and to send data to the first device 102 via the WLAN indicating that the tuner (or a different tuner) is to be tuned to the particular channel. The first device 102 can be adapted to tune the tuner (or a different tuner) to the requested channel in response to such a request and to send television content associated with the requested channel directly to the second device 112 via the WLAN. In one example, a first television tuner at the first device 102 can be tuned to a standard definition channel, and a second television tuner at the first device 102 can be tuned to a high-definition channel in response to data received from the second device 112 requesting television content associated with a high-definition channel.

In one embodiment, the second device 112 can be adapted to receive a command to deactivate a television feature, a particular mode, or to otherwise discontinue outputting television content. The second device 112 can be adapted to send data to the first device 102 via the WLAN indicating that the first device 102 is to discontinue sending television content to the second device 112. The first device 102 can be adapted to discontinue sending television content to the second device 112 via the WLAN in response to such data.

Figure 2:
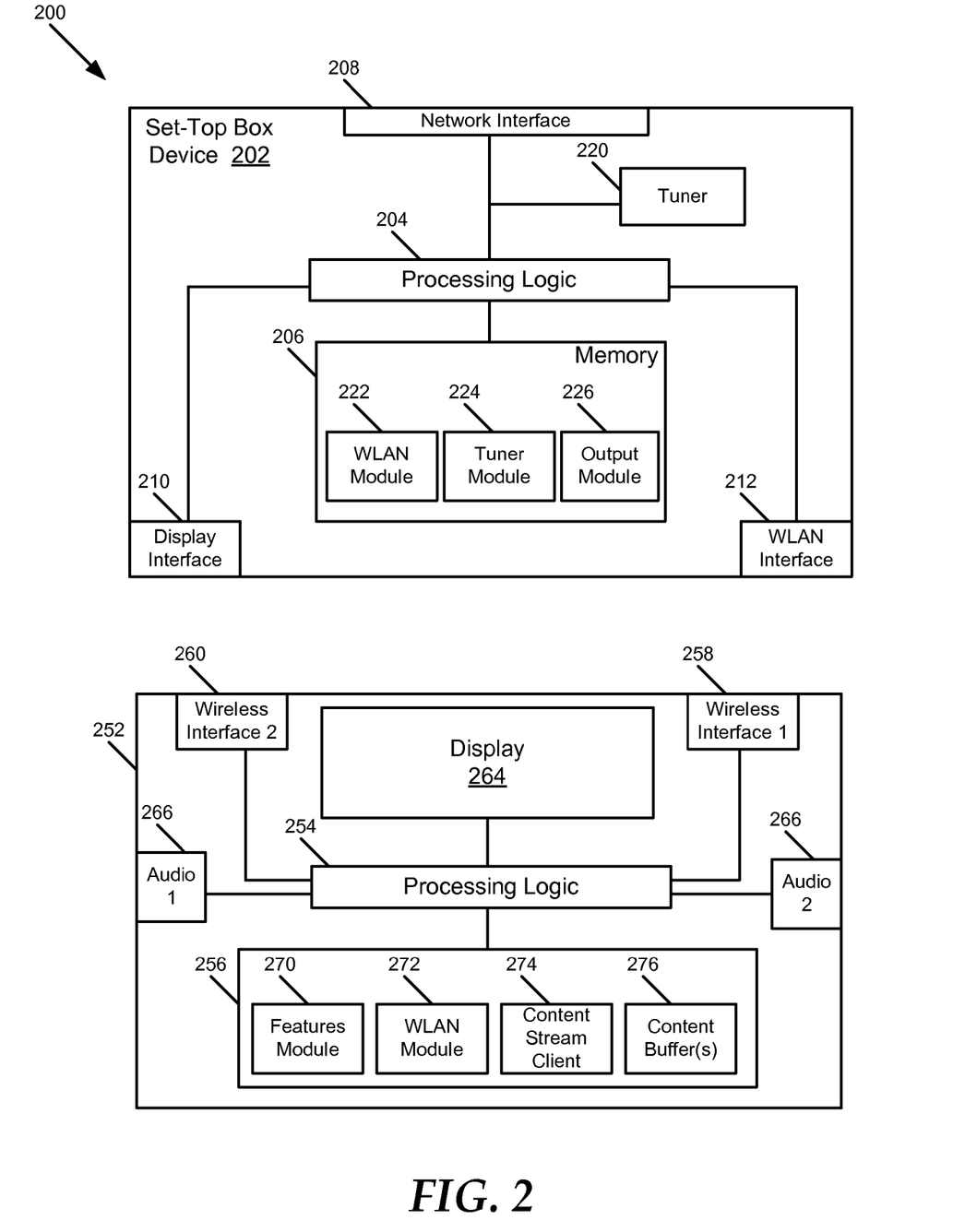
FIG. 2 is a block diagram illustrating a second particular embodiment of a system to deliver television content.

FIG. 2 illustrates a second particular embodiment of a system 200 to deliver television content. The system 200 includes a first device that is equipped with a television tuner, such as the set-top box device 202, which is adapted to communicate with a second device 252 that is not equipped with a television tuner, such as a wireless device or other device.

The set-top box device 202 includes processing logic 204 and memory 206 accessible to the processing logic 204. The set-top box device 202 also includes a network interface 208 that is adapted to facilitate communication between the set-top box device 202 and a television service provider network. Further, the set-top box device 202 includes a display interface 210 that is adapted to send television content to a display device (not shown), such as a television, which is coupled to the set-top box device 202. In addition, the set-top box device 202 includes a wireless local area network (WLAN) interface 212, such as a Wi-Fi interface or other WLAN interface, which is adapted to facilitate wireless communication between the set-top box device 202 and one or more wireless devices within a local area about the set-top box device 202 (e.g., within 120 feet or less), such as at a user premises. Moreover, the set-top box device 202 includes at least one television tuner 220 that is adapted to receive television content associated with various channels, such as video channels, music channels, other channels, or any combination thereof.

In a particular embodiment, the memory 206 includes a plurality of modules 222-226. The modules 222-226 can include computer instructions that are readable and executable by the processing logic 204 to implement various functions of the set-top box device 202 with respect to delivering television content. For example, the modules 222-226 can represent various aspects of one or more software applications, operating systems, or other computer programs. In other embodiments, the modules 222-226 can be implemented as hardware logic or a combination of hardware logic and computer instructions. The memory 206 can also include modules related to additional functions of the set-top box device 202.

The memory 206 includes a WLAN module 222 that is executable by the processing logic 204 to enable the set-top box device 202 to receive and send data via the WLAN interface 212. For example, the WLAN module 222 is executable by the processing logic 204 to receive a request for television content from the second device 252 via the WLAN interface 212. In another example, the WLAN module 222 is executable by the processing logic 204 to receive data indicating that the television tuner 220 is to be tuned to a particular channel. In still another example, the WLAN module 222 is executable by the processing logic 204 to receive data indicating that the set-top box device 202 is to discontinue sending television content to the second device 252.

The memory 206 also includes a tuner module 224 that is executable by the processing logic 204 to tune the tuner 220 to a particular channel, or otherwise cause the tuner 220 to receive television content associated with a particular channel, in response to television content requests, channel change requests, or other data received from the second device 252, one or more other wireless devices, or a combination thereof, indicating that the tuner 220 is to be tuned to the particular channel. Further, the memory 206 includes an output module 226 that is executable by the processing logic 204 to send television content received via the television tuner 220 directly to the second device 252 via the WLAN interface 212. In one embodiment, the output module 226 is executable by the processing logic 204 to narrowcast television content to one or more requesting devices, such as the second device 252. The output module 226 can also be executable by the processing logic 204 to discontinue sending television content to the second device 252 via the WLAN interface 212 in response to data received via the WLAN interface 212 indicating that the set-top box device 202 is to discontinue sending television content to the second device 252. In an illustrative embodiment, the output module 226 is also executable by the processing logic 204 to send television content to a display device coupled to the set-top box device 202 via the display interface 210.

The second device 252 includes processing logic 254 and memory 256 accessible to the processing logic 254. The second device 252 also includes a first wireless interface 258 adapted to receive and send communications between the second device 252 and the WLAN interface 212 of the set-top box device 202, or another device equipped with a television tuner, via a Wi-Fi network or other WLAN. In a particular embodiment, the wireless device 252 can include a second wireless interface 260 that is adapted to communicate with another wireless network, such as a cellular network. In an illustrative embodiment, the second device 252 includes a display portion 264 and at least one audio output 266, such as at least one integrated speaker, at least one external speaker interface, at least one headphone interface, or a combination thereof.

In a particular embodiment, the memory 256 includes a plurality of modules 270-276. The modules 270-276 can include computer instructions that are readable and executable by the processing logic 254 to implement various functions of the second device 252 with respect to delivering television content. For example, the modules 270-276 can represent various aspects of one or more software applications, operating systems, or other computer programs. In other embodiments, the modules 270-276 can be implemented as hardware logic or a combination of hardware logic and computer instructions. The memory 256 can also include modules related to additional functions of the second device 252.

In a particular embodiment, the memory 256 includes a features module 270 that is executable by the processing logic 254 to receive input requesting that television content be output at the second device 252. The input can comprise, for example, a selection of a physical switch, button or other part (not shown) of the second device 252, or a selection of a graphical menu item, icon, text, or other indicator, displayed at the second device 252. In one embodiment, the features module 270 can be executable by the processing logic 254 to activate the first wireless interface 258 in response to the selection. In an illustrative, non-limiting embodiment, the features module 270 can also be executable by the processing logic 254 to deactivate the second wireless interface 260 in response to the input.

Further, the features module 270 can be executable by the processing logic 254 to activate, or shift the second device 252 to, a WLAN mode, television mode, or other mode in response to the input. Further, the features module 270 is executable by the processing logic 254 to receive second input requesting that television content no longer be output at the second device 252. The features module 270 can be executable by the processing logic 254 to deactivate the first wireless interface 258, activate the second wireless interface 260, activate or shift the second device 252 to a non-WLAN mode, or any combination thereof, in response to the second input.

The memory 256 also includes a WLAN module 272 that is executable by the processing logic 254 to send a request for television content to the set-top box device 202 or other device equipped with a television tuner via the first wireless interface 258. The WLAN module 272 is also executable by the processing logic 254 to send data to the set-top box device 202 via the first wireless interface 258 indicating that a tuner at the set-top box device 202 is to be tuned to a particular channel. Further, the WLAN module 272 is also executable by the processing logic 254 to send data to the set-top box device 202 via the first wireless interface 258 indicating that the set-top box device 202 is to discontinue sending television content to the second device 252.

The memory 256 also includes a content stream client 274 that is executable by the processing logic 254 to receive television content directly from the set-top box device 202 via the first wireless interface 258 and to output the television content via the display portion 264, the audio output(s) 266, or a combination thereof The television content can include video content, audio content, or a combination thereof In an illustrative embodiment, the memory 256 can also include at least one content buffer 276 (e.g., at least one video buffer, at least one audio buffer or a combination thereof) to store and buffer television content to prevent underflow to the display portion 264 and the audio output(s) 266.

Figure 3:
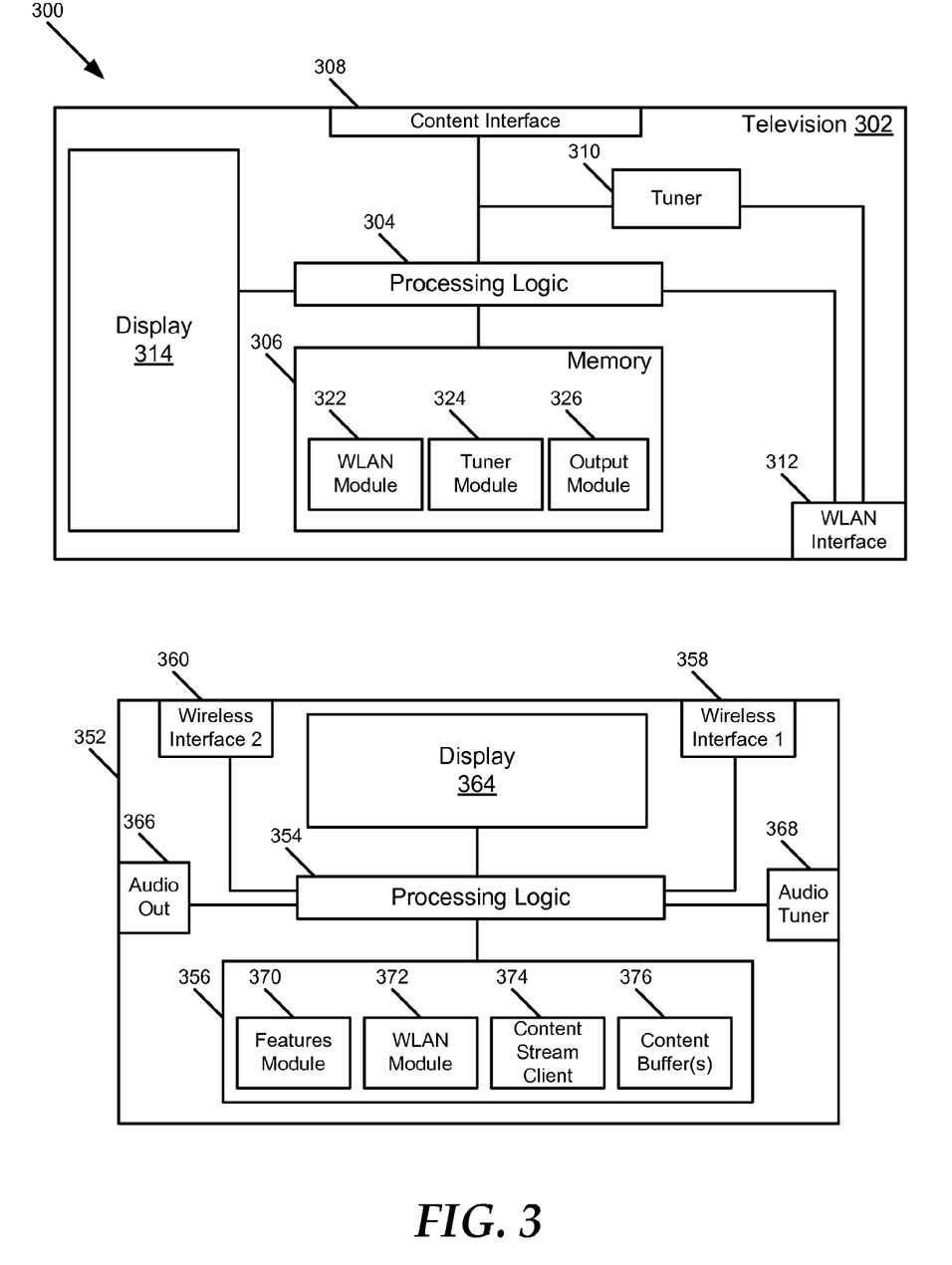
FIG. 3 is a block diagram illustrating a third particular embodiment of a system to deliver television content.

FIG. 3 illustrates a third particular embodiment of a system 300 to deliver television content. The system 300 includes a first device that is equipped with a television tuner, such as the television 302, which is adapted to communicate with a second device that is not equipped with a television tuner, such as the second device 352.

The television 302 includes processing logic 304 and memory 306 accessible to the processing logic 304. The television 302 also includes at least one content interface 308 that is adapted to facilitate communication between the television 302 and a set-top box device 302, a television service provider network, or another source of television content. For instance, the at least one content interface 308 can comprise a network port, an interface to an antenna, another content interface, or any combination thereof. Further, the television 302 includes at least one television tuner 310 that is adapted to receive television content associated with various channels, such as video channels, music channels, other channels, or any combination thereof.

In addition, the television 302 includes a wireless local area network (WLAN) network interface 312 that is adapted to facilitate wireless communication between the television 302 and one or more wireless devices at a local area about the television 302, such as at a user premises. In one embodiment, the WLAN interface 312 can communicate with the television tuner 310. The television 302 also includes a display portion 314. In illustrative embodiment, the television 302 can also include one or more audio outputs (not shown), such as one or more speakers, one or more speaker interfaces, one or more headphone interfaces, one or more other audio output interfaces, or any combination thereof.

In a particular embodiment, the memory 306 includes a plurality of modules 322-326. The modules 322-326 can include computer instructions that are readable and executable by the processing logic 304 to implement various functions of the television 302 with respect to delivering television content. For example, the modules 322-326 can represent various aspects of one or more software applications, operating systems, or other computer programs. In other embodiments, the modules 322-326 can be implemented as hardware logic or a combination of hardware logic and computer instructions. The memory 306 can also include modules related to additional functions of the television 302.

The memory 306 includes a WLAN module 322 that is executable by the processing logic 304 to enable the tuner 310 to receive and send data via the WLAN interface 312. For example, the WLAN module 322 can be executable by the processing logic 304 to cause the tuner 310 to communicate with the WLAN interface 310 in response to a request for television content from the second device 352 via the WLAN interface 312. The tuner 310 can be adapted to receive television content requests, channel change requests, or other data indicating that the tuner 310 is to be tuned to a particular channel, from the second device 352, one or more other wireless devices, or a combination thereof, via the WLAN interface 312. In addition, the tuner 310 is adapted to tune to a requested channel, in response to such data, via the WLAN interface 312. Further, the tuner 310 can be adapted to send television content associated with a requested channel directly to the second device 352 via the WLAN interface 312. In an illustrative embodiment, the WLAN module 322 is executable by the processing logic 304 to enable the tuner 310 to cause the WLAN interface 312 to narrowcast television content to the second device 352.

In another example, the WLAN module 322 is executable by the processing logic 304 to receive data indicating that the set-top box device 302 is to discontinue sending television content to the second device 352. The WLAN module 322 can be executable by the processing logic 304 to deactivate communication between the tuner and the WLAN interface 312 or to otherwise cause the tuner 310 to discontinue sending television content to the second device 352 via the WLAN interface.

In an illustrative embodiment, the memory 306 can include a tuner module 324 that is executable by the processing logic 304 to cause the tuner 310 to tune to a channel requested to be output at the television 302 via a remote control, for example. Further, the memory 306 can include an output module 326 that is executable by the processing logic 304 to output television content received via the tuner 310 from the content interface 308, from an over-the-air source, or a combination thereof, via the display 314, at least one audio interface (not shown), or a combination thereof.

The second device 352 includes processing logic 354 and memory 356 accessible to the processing logic 354. The second device 352 also includes a first wireless interface 358 adapted to receive and send communications between the second device 352 and the WLAN interface 312 of the television 302, or another device equipped with a television tuner, via a Wi-Fi network or other WLAN. In a particular embodiment, the second device 352 can include a second wireless interface 360 that is adapted to communicate with another wireless network, such as a cellular network. The second device 352 can also include a display portion 364 and at least one audio output 366, such as at least one integrated speaker, at least one external speaker interface, at least one headphone interface, or a combination thereof. In an illustrative, non-limiting embodiment, the second device 352 can include at least one audio tuner 368, such as a radio tuner or other non-television tuner.

In a particular embodiment, the memory 356 includes a plurality of modules 370-376. The modules 370-376 can include computer instructions that are readable and executable by the processing logic 354 to implement various functions of the second device 352 with respect to delivering television content. For example, the modules 370-376 can represent various aspects of one or more software applications, operating systems, or other computer programs. In other embodiments, the modules 370-376 can be implemented as hardware logic or a combination of hardware logic and computer instructions. The memory 356 can also include modules related to additional functions of the second device 352.

In a particular embodiment, the memory 356 includes a features module 370 that is executable by the processing logic 354 to receive input requesting that television content be output at the second device 352. The input can comprise, for example, a selection of a physical switch, button or other part (not shown) of the second device 352, or a selection of a graphical menu item, icon, text, or other indicator, displayed at the second device 352. In one embodiment, the features module 370 can be executable by the processing logic 354 to activate the first wireless interface 358 in response to the selection. In an illustrative, non-limiting embodiment, the features module 370 can also be executable by the processing logic 354 to deactivate the second wireless interface 360 in response to the input.

Further, the features module 370 can be executable by the processing logic 354 to activate, or shift the second device 352 to, a WLAN mode, television mode, or other mode in response to the input. Further, the features module 370 is executable by the processing logic 354 to receive second input requesting that television content no longer be output at the second device 352. The features module 370 can be executable by the processing logic 354 to deactivate the first wireless interface 358, activate the second wireless interface 360, activate or shift the second device 352 to a non-WLAN mode, or any combination thereof, in response to the second input.

The memory 356 also includes a WLAN module 372 that is executable by the processing logic 354 to send a request for television content to the television 302 or other device equipped with a television tuner via the first wireless interface 358. The WLAN module 372 is also executable by the processing logic 354 to send data to the television 302 via the first wireless interface 358 indicating that a tuner at the television 302 is to be tuned to a particular channel. Further, the WLAN module 372 is also executable by the processing logic 354 to send data to the television 302 via the first wireless interface 358 indicating that the television 302 is to discontinue sending television content to the second device 352.

The memory 356 also includes a content stream client 374 that is executable by the processing logic 354 to receive television content directly from the television 302 via the first wireless interface 358 and to output the television content via the display portion 364, the audio output(s) 366, or a combination thereof The television content can include video content, audio content, or a combination thereof. In an illustrative embodiment, the memory 356 includes at least one content buffer 376 to store and buffer television content to prevent underflow to the display portion 364 and the audio output(s) 366.

Figure 4:
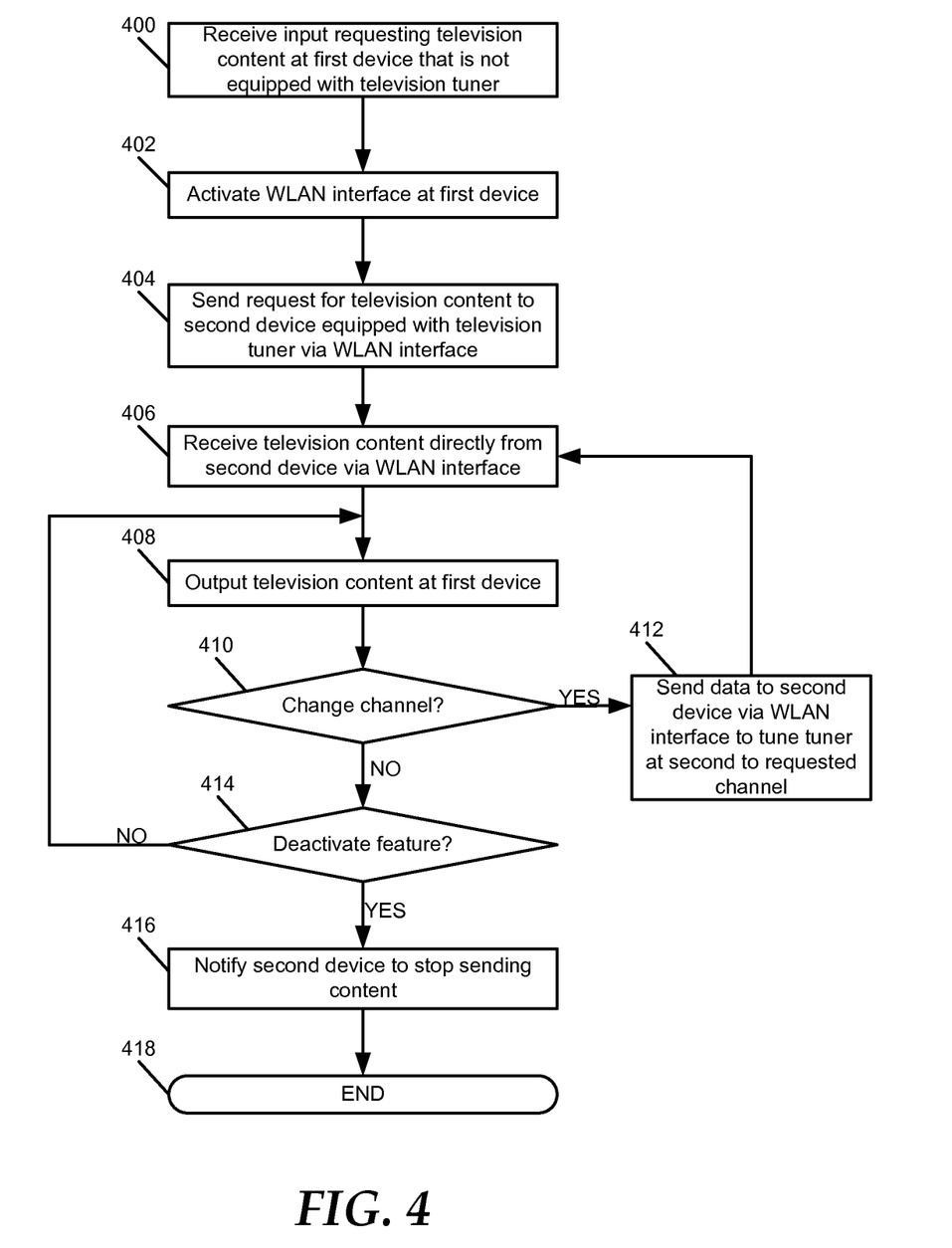
FIG. 4 is a flow diagram illustrating a particular embodiment of a method of delivering television content.

FIG. 4 illustrates a particular embodiment of a method of delivering television content. At block 400, a first device that is not equipped with a television tuner receives an input requesting television content. In an illustrative embodiment, the input can comprise a selection of a graphical menu item, icon, text, or other indicator, displayed at the first device. Moving to block 402, in a particular embodiment, the first device can activate a wireless local area network (WLAN) interface, such as a Wi-Fi interface, at the first device. In some embodiments, the first device may also deactivate another wireless interface, such as a cellular network interface.

Proceeding to block 404, the first device sends a request for television content via the WLAN interface to a second device equipped with a television tuner, such as a set-top box device, a television, or another device equipped with a television tuner. The request may identify a particular television channel. Continuing to block 406, the first device receives the television content directly from the second device via the WLAN interface at the first device. In an illustrative embodiment, the first device can receive the television content via narrowcast from the second device. Advancing to block 408, the first device outputs the television content via a display portion, at least one audio output, or a combination thereof. The television content can include video content, audio content, or a combination thereof.

At decision node 410, in a particular embodiment, the first device can determine whether it has received a command to request content associated with a particular television channel. If the first device has received such a command, the method moves to block 412, and the first device sends data to the second device via the WLAN interface at the first device indicating that the tuner (or a different tuner) at the second device is to be tuned to the particular channel. The method can then return to block 406, and the first device can receive television content associated with the requested channel directly from the second device via the WLAN interface.

Returning to decision node 410, if the first device does not receive a command to request content associated with a different television channel, the method can proceed to decision node 414, and the first device can determine whether it has received a command to deactivate a television feature or to otherwise discontinue outputting television content at the first device. If the first device does not receive such a command, the method can return to block 408, and the first device can continue outputting television content. Whereas, if the first device receives a command to discontinue outputting television content, the method continues to block 416, and the first device sends data to the second device, via the WLAN interface at the first device, indicating that the second device is to discontinue sending television content to the first device. The method terminates at 418.

Figure 5:
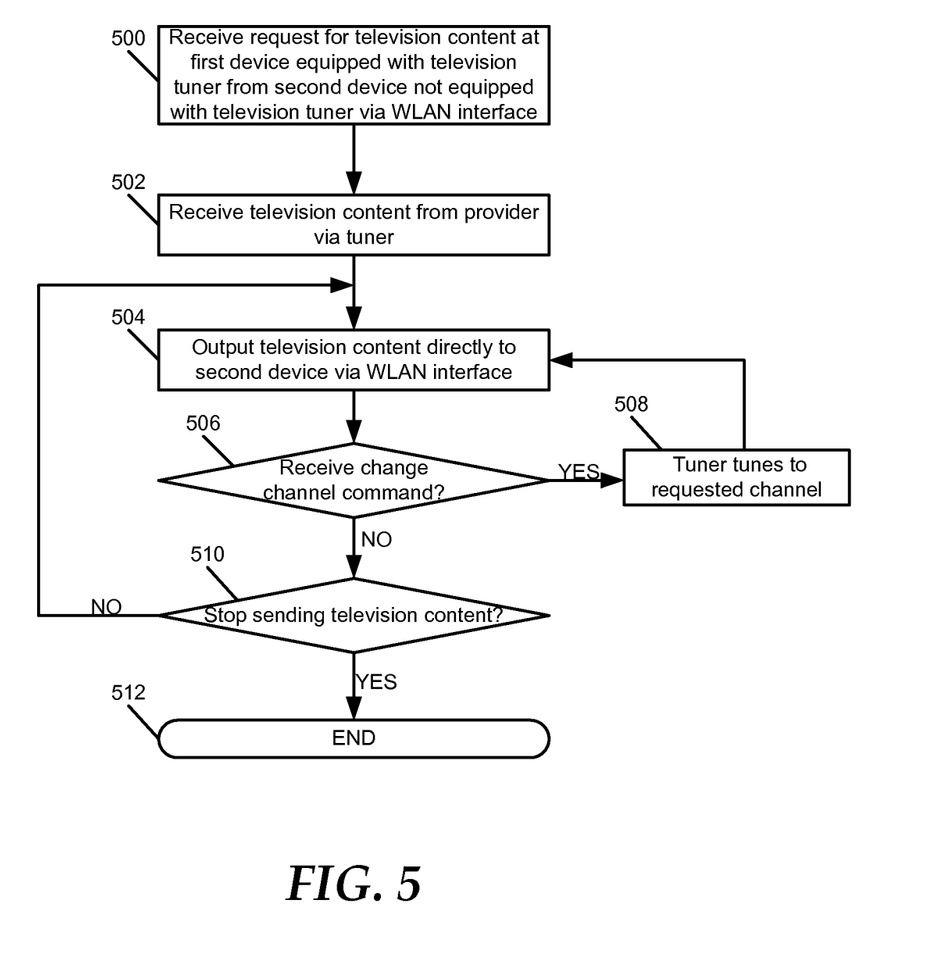
FIG. 5 is a flow diagram illustrating a second particular embodiment of a method of delivering television content.

FIG. 5 illustrates a second particular embodiment of a method of delivering television content. At block 500, a first device equipped with a television tuner receives a request for television content from a second device that is not equipped with a television tuner. The request is received via a wireless local area network (WLAN) interface, such as a Wi-Fi interface, at the first device. Moving to block 502, the first device receives television content from a television service provider or other source via a television tuner. Proceeding to block 504, the first device outputs the television content directly to the second device via the WLAN interface at the first device.

Continuing to decision node 506, the first device can determine whether it has received a request from the second device for television content associated with another particular channel. If the first device has received such a request, the method advances to block 508, and the tuner (or a different tuner) at the first device is tuned to the other particular channel. The method can then return to block 504, and the first device outputs television content associated with the other particular channel directly to the second device via the WLAN interface at the first device.

Returning to decision node 506, in a particular embodiment, if the first device does not receive a request for television content associated with another particular channel, the method can move to decision node 510, and the first device can determine whether it has received data indicating that it is to discontinue sending television content to the second device. If the first device has not received such data, the method can return to block 504, and the first device can continue sending television content to the second device via the WLAN interface. On the other hand, if the first device has received data indicating that it is to discontinue sending television content to the second device, the method terminates at 512.

In some embodiments, the methods disclosed herein can be performed as described with reference to FIGS. 4-5. In other embodiments, aspects of the methods can be performed in alternative sequences or simultaneously.

Figure 6:
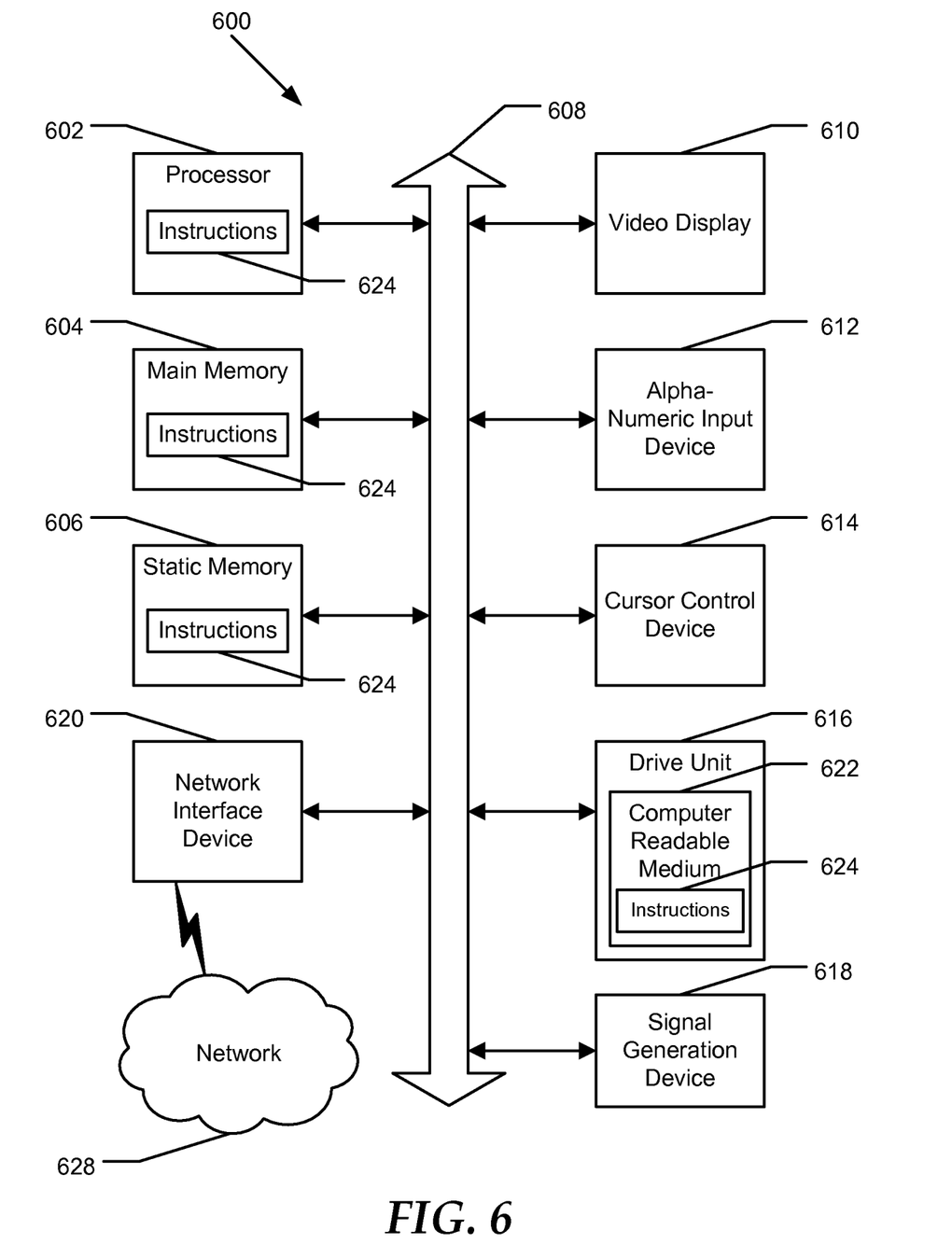
FIG. 6 is a block diagram illustrating a particular embodiment of a general computer system.

FIG. 6 shows an illustrative embodiment of a general computer 600 including a set of instructions that can be executed to cause the computer system to perform any one or more of the methods or computer based functions disclosed herein. The computer system 600 may operate as a standalone device or may be connected, e.g., using a network, to other computer systems or peripheral devices. In an illustrative embodiment, such standalone and peripheral devices can include, for example, set-top box devices, televisions, wireless devices, other devices equipped with at least one television tuner, other devices not equipped with a television tuner, or any combination thereof, as illustrated in FIGS. 1-3.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A non-transitory computer-readable medium comprising computer instructions which when executed by a processor causes the processor to perform operations comprising:
receiving, by a cellular telephone, a request for high definition television content, wherein the cellular telephone is not equipped with a television tuner, wherein the cellular telephone has a first wireless interface for transmitting and receiving wireless fidelity communication signals, and a second wireless interface for transmitting and receiving cellular communication signals;
deactivating, by the cellular telephone, responsive to receiving the request for high definition television content, the second wireless interface to prevent transmitting and receiving the cellular communication signals;
activating, by the cellular telephone, responsive to receiving the request for high definition television content, the first wireless interface to enable transmitting and receiving the wireless fidelity communication signals;
sending, by the cellular telephone, via the first wireless interface the request for high definition television content to a set top box that is equipped with a first television tuner and a second television tuner, wherein sending the request for high definition television content to the set top box causes the set top box to tune the first television tuner to a first channel that is a standard definition channel, and causes the set top box to tune the second television tuner to a second channel that is a high definition channel;
receiving, by the cellular telephone, the high definition television content from the set top box via the first wireless interface in response to sending the request to the set top box;
outputting, by the cellular telephone, the high definition television content at a display portion of the cellular telephone;
receiving a command at the cellular telephone to discontinue outputting the high definition television content at the display portion; and
sending, by the cellular telephone, data to the set top box via the first wireless interface indicating that the set top box is to discontinue sending the high definition television content to the cellular telephone.

2. The non-transitory computer-readable medium of claim 1, wherein the high definition television content is received at the cellular telephone via a narrowcast transmission from the set top box.

3. The non-transitory computer-readable medium of claim 1, wherein operations further comprise receiving input at the cellular telephone requesting that the high definition television content be output at the display portion of the cellular telephone before sending the request to the set top box.

4. The non-transitory computer-readable medium of claim 3, wherein the input comprises a detectable selection of a physical switch, button or part of the cellular telephone, or a selection of a graphical menu item, icon, or text displayed at the display portion of the cellular telephone.

5. The non-transitory computer-readable medium of claim 1, comprising computer instructions which when executed by the processor cause the processor to perform operations comprising:
receiving a command at the cellular telephone to request updated television content associated with a particular television channel;
sending data to the set top box, via the first wireless interface, indicating that the first television tuner is to be tuned to the particular television channel; and
receiving the updated television content associated with the particular channel at the cellular telephone from the set top box via the first wireless interface.

6. A cellular telephone, comprising:
a display device;
a first wireless interface that is a wireless fidelity interface;
a second wireless interface that is a cellular network interface;
processing logic and memory accessible to the processing logic, wherein
the memory includes computer instructions, wherein the processing logic, responsive to executing the computer instructions, performs operations comprising:
receiving a request for high definition television content, wherein the cellular telephone is not equipped with a television tuner;

deactivating the second wireless interface in response to receiving the request to prevent transmitting and receiving cellular communication signals;

activating the first wireless interface responsive to receiving the request the first wireless interface to enable transmitting and receiving wireless fidelity communication signals;

sending the request for high definition television content to a set top box device that is equipped with a first television tuner and a second television tuner via the first wireless interface, wherein sending the request to the set top box causes the set top box device to tune a first television tuner to a first channel that is a standard definition channel, and causes the set top box to tune the second television tuner to a second channel that is a high definition channel;

receiving the high definition television content from the set top box device via the first wireless interface in response to sending the request to the set top box;

outputting the high definition television content at a display portion of the cellular telephone;

receiving a command to discontinue outputting the high definition television content at the display portion; and sending data to the set top box via the first wireless interface indicating that the set top box device is to discontinue sending the high definition television content to the cellular telephone.

7. The cellular telephone of claim 6, wherein the wireless fidelity interface establishes communications with a wireless local area network responsive to the activating the first wireless interface.

8. The cellular telephone of claim 6, wherein the cellular telephone is an integral part of a tablet or a computer.

9. The cellular telephone of claim 6, further comprising an audio interface and wherein the outputting of the high definition television content comprises outputting an audio portion of the high definition television content by way of the audio interface.

10. The cellular telephone of claim 6, wherein the operations further comprise activating the second wireless interface in response to the command.

11. The cellular telephone of claim 6, wherein the memory includes a content buffer.

12. The cellular telephone of claim 6, wherein the display portion includes a non-television tuner.

13. A non-transitory computer-readable medium comprising computer instructions which when executed by at least one a processor causes the at least one processor to perform operations comprising:

receiving, by a set top box, a first request for high definition television content from a cellular telephone via a wireless interface for transmitting and receiving wireless fidelity communication signals, wherein the cellular telephone is not equipped with a television tuner, and wherein the cellular telephone deactivates a cellular communications interface and activates a wireless fidelity communications interface responsive to sending the first request;

responsive to receiving the first request for high definition television content, tuning, by the set top box, a first television tuner to a first channel that is a standard definition channel, and tuning a second television tuner to a second channel that is a high definition channel;

sending, by the set top box, the high definition television content to the cellular telephone via the wireless interface for outputting at a display portion of the cellular telephone, wherein the high definition television content is received at the set top box via the second television tuner;

receiving, by the set top box, via the wireless interface a second request from the cellular telephone to discontinue sending of the high definition television content via the wireless interface, wherein the cellular telephone sends the second request responsive to receiving a command to discontinue outputting the high definition television content at the display portion; and discontinuing, by the set top box, sending the high definition television content to the cellular telephone via the wireless interface responsive to receiving the second request.

14. The non-transitory computer-readable medium of claim 13, wherein the operations further comprise tuning the first and second television tuners according to data included in the first request.

15. A set top box, comprising:
a first television tuner;
a second television tuner;
a memory to store computer instructions; and
a processor coupled to the memory, wherein the processor, responsive to executing the computer instructions, performs operations comprising:

receiving a first request for high definition television content from a cellular telephone via a wireless interface for transmitting and receiving wireless fidelity communication signals, wherein the cellular telephone is not equipped with a television tuner, and wherein the cellular telephone deactivates a cellular communications interface and activates a wireless fidelity communications interface responsive to sending the first request;

responsive to receiving the first request for high definition television content, tuning the first television tuner to a first channel that is a standard definition channel, and tuning the second television tuner to a second channel that is a high definition channel;

sending the high definition television content to the cellular telephone via the wireless interface for outputting at a display portion of the cellular telephone, wherein the high definition television content is received at the set top box via the second television tuner;

receiving via the wireless interface a second request from the cellular telephone to discontinue sending of the high definition television content via the wireless interface, wherein the cellular telephone sends the second request responsive to receiving a command to discontinue outputting the high definition television content at the display portion; and discontinuing sending the high definition television content to the cellular telephone via the wireless interface responsive to receiving the second request.

16. The set top box of claim 15, wherein sending the high definition television content comprises narrowcasting the high definition television content to the display portion via a wireless fidelity network.

17. The set top box of claim 15, wherein the set top box includes a network interface and wherein one of the first or second television tuners receives television content from a cable network, a satellite network, or an Internet Protocol Television network via the network interface.

18. The set top box of claim 15, wherein the high definition television content comprises over-the-air television content.

19. The set top box of claim 15, wherein the cellular telephone is an integral component of a tablet, or a computer.

20. The set top box of claim 15, wherein the first or second television tuners at the set top box send the high definition television content directly to the cellular telephone via the wireless interface.

* * * * *